Patented Aug. 10, 1954

2,686,130

UNITED STATES PATENT OFFICE 2,686,130

PROCESS OF CANNING RICE

Robert L. Roberts, Walnut Creek, Calif., assignor to the United States of America as represented by the Secretary of Agriculture No Drawing. Application January 23, 1952, Serial No. 267,905

7 Claims. (Cl. 99—186)

(Granted under Title 35, U. S. Code, (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the canning of rice. In particular, it relates to a technique of canning white rice whereby to prepare a product which merely requires heating in water for not more than one minute to prepare it for the table. The canned rice in accordance with this invention is particularly characterized by its high organoleptic qualities, thus with regard to color it is a brilliant white comparable to best quality freshly cooked white rice; in separation of grains it is superior to best quality freshly cooked white rice; in flavor and texture it is virtually indistinguishable from best quality freshly cooked white rice.

Rice is used throughout the world and recognized to be a valuable foodstuff. However, white rice, the usual rice of commerce, has the disadvantage that its cooking requires considerable time and some degree of skill on the part of the cook. The point is that the rice must be cooked to such an extent as to tenderize the grains but the cooking period must not be prolonged to such an extent that the starch granules in the rice burst to produce a sticky product. Usually, the proper cooking of rice involves boiling it in water for 30–40 minutes. This period of time may be considerably shortened if the rice is soaked in water prior to cooking. In any event, care is always required to avoid over-cooking, thus to prevent formation of an unpalatable sticky product.

The disadvantages of ordinary rice have long been recognized and several methods have been advocated to prepare a pre-cooked, canned rice which can be heated to prepare in a few minutes a dish of cooked rice. None of the prior procedures have yielded a truly satisfactory product. The main difficulty encountered is that the rice grains lose their individuality, partially disintegrate and become stuck together forming a gummy, unpalatable product. Other disadvantages are that the canned products do not retain their original whiteness but develop an unsightly brownish cast, and that the products lose their natural flavor and often develop a flavor somewhat like that of hominy. The most obvious technique for canning rice involves sealing cooked white rice in cans and then retorting the sealed cans to sterilize the contents and the insides of the cans. Such a product is wholly unpalatable because the grains stick together to form a pasty mass. In attempts to alleviate this situation, the rice has been cooked in acidified water prior to canning. However, this procedure is still unsatisfactory. Although the acid helps to maintain the white color of the rice, the product is still a congealed gummy mass of adhering, distorted grains. Another suggested procedure involves placing raw white rice into a can together with a measured amount of water required to form a final product of desired moisture content. The can is then sealed and autoclaved to sterilize the contents. This technique is unsatisfactory because the lower layer of rice in contact with the water is converted into a sticky paste while the grains above the water level are largely under-cooked. To overcome these difficulties various additives such as edible oils have been mixed with the rice. Such materials help somewhat to keep the grains separate but are not completely satisfactory and further introduce foreign and undesirable materials and flavors. Addition of an oil also complicates the picture because the oil itself is prone to rancidification on storage so that the odor and taste of the product is impaired on storage. Another technique which has been advocated is to start with dry parboiled rice instead of white rice. Parboiled rice is prepared by steeping rough (paddy) rice in hot water, steaming it under pressure, then drying the cooked product and milling it to remove the hull, germ, and bran layers. The resulting product consists essentially of the rice endosperm in an at least partially cooked state. The products made by canning parboiled rice do exhibit a fair separation of grains but their color is dark, being of a grayish or brownish color and further they have a definite off-odor and flavor and no characteristic flavor of freshly cooked white rice. Despite much work by skilled investigators the fact remains that none of the prior techniques is truly satisfactory.

I have now found that if rice is canned by the particular procedure as hereinafter described a completely successful product is obtained. The canned product merely needs to be heated in water for one minute to make it ready for the table; it is brilliant white in color; the grains are completely separate; the odor, flavor, and texture of the product are virtually indistinguishable from those exhibited by a high quality freshly-cooked rice. With regard to separation of grains it is to be emphasized that my product exhibits a better separation than freshly cooked rice. No foreign agents or additives are used so that the canned material consists entirely of rice with the necessary proportion of moisture. The product in accordance with this invention presents two main advantages to the consumer. The first is that the product is ready for the table in one minute, the second is that no culinary skill is required as in the case of cooking raw white rice.

The canning procedure in accordance with this invention is described as follows:

The raw material is white rice. As well known in the art, white rice is prepared by subjecting rough (paddy) rice to milling operations to remove the husk, germ, and bran layers, then given a polishing treatment to improve its appearance. White rice is completely raw and consists entirely of the rice endosperm. Any of the known varieties may be used in the practice of this invention whether of the long- or short-grain type.

The white rice is first soaked in water. Usually water at about room temperature is used for convenience although the water may be warmed to accelerate hydration of the rice grains, thus the temperature of soaking may be from about 20° C. to about 60° C. Generally the soaking is carried out for about 30–60 minutes, the aim being to increase the moisture content of the grains to its equilibrium content or about 30%.

The soaked rice is then subjected to a partial cooking operation by boiling in water or by subjection to live steam, the former being preferred. The purpose of this partial cooking is to partially gelatinize the starch in the rice grains so that their moisture content can be increased above the level obtained in the soaking operation. It is critical that the conditions of this cooking operation be restricted so that the grains contain not more than about 45–60% water, preferably the grains should contain about 55% water. The duration of cooking will vary depending on the variety of rice, thus for example with a short-grained rice such as Pearl, a 1 to 2 minute boiling will be adequate whereas with a long-grain rice such as Patna, a 3 to 4 minute boiling will be required. In any case, the duration of the boiling should be about in the range of 1 to 5 minutes and the pilot operations can be carried on small samples of the variety in question to determine the amount of boiling necessary to obtain the desired 45 to 60% moisture content. It is to be observed that at this moisture level the grains are not cooked to an edible state; to get to an edible state a moisture content of 65–75% is required. Thus the partially cooked grains have soft exteriors but their centers are still somewhat hard and raw. The significance of cooking only to the point of 45 to 60% moisture content is that thereby the rice grains are in a condition in which they can be subjected to a subsequent heat processing step (required for sterilization) without forming a pasty mass. The grains at this moisture level upon further heating in the can become completely cooked but remain as separate grains—the grains retain their natural shape and do not stick to one another. It might be said that at the 45 to 60% moisture level the grains are "conditioned" so that further heating at such moisture level will not exert deleterious effects. Such a result is impossible where the cooking prior to canning has been virtually complete. In such case the grains contain 65–75% moisture and when they are heat processed in the can, the grains become distorted and stick together as a gummy mass. Thus completely cooked white rice grains are not conditioned against further heat treatment but are adversely affected by such heating.

If desired, the soaking step can be eliminated and the raw white rice directly boiled in water. In this case, of course, it is likewise essential that the grains be cooked only to the point where they contain 45% to 60%, preferably 55% of water. The time of boiling will depend on the variety of rice, in most cases the proper degree of moisture content is attained in about 4 to 10 minutes.

The partially cooked grains are then placed in enamel-lined cans and the cans sealed while under high vacuum, that is a vacuum of 27 or more inches of mercury. Application of high vacuum is a critical feature in my process. I have observed that if no vacuum or low vacuum is used, the canned products tend to lose their whiteness and develop a brownish cast. This phenomenon does not appear to be dependent on the absence of air because the same darkening has been observed if the air is replaced by nitrogen. I therefore believe that the darkening is due to development of high pressure in the cans during the subsequent retorting operation. By supplying a high vacuum prior to sealing, high pressures are not developed in the cans during retorting. Application of the aforesaid high vacuum will reduce the moisture content of the partially cooked grains by a small amount, about 1–3%, which is not undesirable.

The sealed cans are then subjected to a retorting or autoclaving operation to sterilize the contents and the insides of the cans. This operation is carried out in the same manner as is common to all vegetable canning operations and requires that the cans be subjected to steam under superatmospheric pressure for sufficient period of time to insure destruction of toxic microorganisms and spores. For example with cans up to 3 inches in diameter, it is advisable to apply a temperature of 240° F. for 60 minutes. In general temperatures of 220–270° F. applied for times of 30 min. to 120 minutes may be used depending on the size of the cans.

To prepare the product for serving, the contents of the can are immersed in boiling water for not more than one minute, then drained.

If desired, other food items such as poultry, tomato paste, or other foods or spices or condiments may be added to the partially cooked rice prior to placing in cans. In this event, care should be taken that the total moisture content (that present in both rice and added foodstuff) be within the range 45–60%.

The following examples demonstrate the invention in greater detail.

*Example I*

One kilogram of Patna (long-grain) white rice was soaked in cold tap water for about an hour. The soaked rice was then boiled in water for 4 minutes. The rice was then filled while hot into 211 x 300 enamel-lined cans which were sealed while under a vacuum of 29" Hg. The cans were autoclaved 60 minutes at 240° F. then cooled and held at room temperature for about 3 weeks.

The canned product, which had a moisture content of about 55%, was then appraised by a panel of qualified food tasters along with a sample of freshly cooked Patna white rice from the same original batch and a sample of a commercially available canned rice prepared from parboiled rice. The products were rated on a basis of 7 as the perfect score and decreasing numbers to 1 for less desirable quality. The following results were obtained by averaging scores from 3 replications of the test:

| Sample | Color | Separation of grains | Flavor | Texture |
|---|---|---|---|---|
| Product of Ex. I | 6.55 | 6.43 | 5.91 | 6.23 |
| Freshly cooked rice | 6.80 | 5.04 | 6.36 | 5.70 |
| Commercial canned rice | 4.52 | 5.99 | 5.51 | 5.55 |

*Example II*

One kilogram of California Pearl white rice was soaked in cold tap water for about an hour. The soaked rice was then boiled in water for 1½ minutes. The rice was then filled while hot into 211 x 300 enamel-lined cans which were sealed while under a vacuum of 29" Hg. The cans were autoclaved 60 minutes at 240° F. then cooled and held at room temperature for about 2 weeks.

The canned product, which had a moisture content of about 50%, was appraised along with a sample of freshly cooked white rice from the same batch. The products were scored as in Example I. The following results were obtained by averaging scores from three replications of the test:

| Sample | Color | Separation of grains | Flavor | Texture |
|---|---|---|---|---|
| Product of Ex. II | 5.97 | 6.22 | 5.93 | 5.92 |
| Freshly cooked rice | 6.54 | 3.77 | 6.35 | 4.74 |

Having thus described my invention, I claim:

1. A process for canning rice which comprises soaking white rice in water, partially cooking the soaked rice until its moisture content is about from 45–60%, filling the partially cooked rice at the aforesaid moisture level into containers, subjecting the containers to a high vacuum, sealing the containers while under high vacuum, and subjecting the sealed containers of partially cooked rice to a heat-processing operation to sterilize the contents and the insides of the containers.

2. A process for canning rice which comprises soaking white rice in water, partially cooking the soaked rice until its moisture content is about 45–60%, filling the partially cooked rice at the aforesaid moisture level into containers, subjecting the containers to a high vacuum of at least 27 inches of mercury, sealing the containers while under such high vacuum, and subjecting the sealed containers containing solely the partially-cooked rice to a heat processing operation to sterilize the contents and the insides of the containers.

3. A process for canning rice which comprises soaking white rice in water, boiling the soaked rice in water until its moisture content is about from 45 to 60%, filling the partially-cooked rice at the aforesaid moisture level into containers, subjecting the containers to high vacuum, sealing the containers while under high vacuum and subjecting the sealed containers of partially-cooked rice to a heat-processing operation to sterilize the contents and the insides of the containers.

4. A process for canning rice which comprises soaking white rice in water at about 20 to 60° C., partially cooking the soaked rice until its moisture content is about from 45 to 60%, filling the partially-cooked rice at the aforesaid moisture level into containers, subjecting the containers to high vacuum, sealing the containers while under high vacuum, and subjecting the sealed containers of partially-cooked rice to a heat-processing operation to sterilize the contents and the insides of the containers.

5. A process for canning rice which comprises partially cooking white rice until its moisture content is about from 45 to 60%, filling the partially-cooked rice at the aforesaid moisture content into containers, subjecting the containers to high vacuum, sealing the containers while under high vacuum, and subjecting the sealed containers of partially-cooked rice to a heat-processing operation to sterilize the contents and the insides of the containers.

6. A process for canning rice which comprises soaking white rice in water, partially cooking the soaked rice until its moisture content is about 55%, filling the partially-cooked rice at the aforesaid moisture level into containers, subjecting the containers to high vacuum, sealing the containers while under high vacuum, and subjecting the sealed containers of partially-cooked rice to a heat-processing operation to sterilize the contents and the insides of the containers.

7. A process for canning rice which comprises soaking white rice in water at about 20–60° C. until its moisture content is about 30%, boiling the soaked rice in water until its moisture content is increased to about from 45 to 60%, with uniform distribution of moisture, filling the partially-cooked rice at the aforesaid moisture level into containers, subjecting the containers to high vacuum, sealing the containers while under high vacuum, and subjecting the sealed containers of partially-cooked rice to a heat-processing operation to sterilize the contents and the insides of the containers.

References Cited in the file of this patent

UNITED STATES PATENTS

| Number | Name | Date |
|---|---|---|
| 2,055,120 | Domoto | Sept. 22, 1936 |
| 2,292,431 | Coan | Aug. 11, 1942 |
| 2,334,666 | Yonan-Malek | Nov. 16, 1943 |
| 2,438,939 | Ozai-Durrani | Apr. 6, 1948 |

OTHER REFERENCES

"Commercial Fruit and Vegetable Products," Cruess-McGraw-Hill Book Company, New York, Second Edition, 1938, pages 317, 319 and 321.